(No Model.)
P. A. RAYMOND.
LACING STUD FASTENER.
No. 519,847. Patented May 15, 1894.
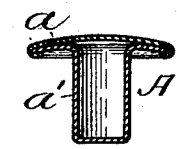
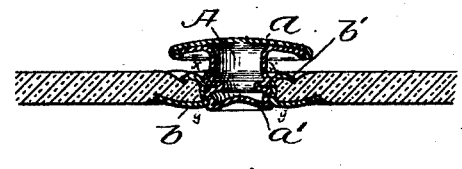
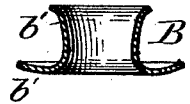
Fig. 1.          Fig. 2.
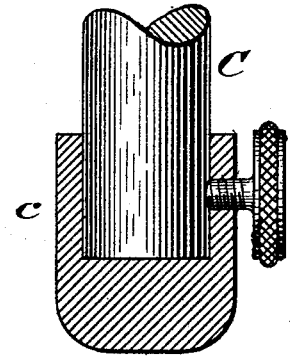
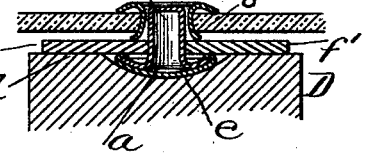
Fig. 5.          Fig. 3.          Fig. 6.
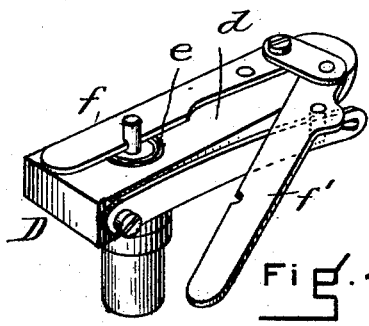
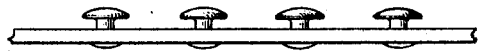
Fig. 4.          Fig. 7.
WITNESSES.
Frank G. Parker
Geo. A. Holmes
INVENTOR
Pierre Albert Raymond
by Jas. B. H. Downs
Atty

UNITED STATES PATENT OFFICE.

PIERRE ALBERT RAYMOND, OF GRENOBLE, FRANCE, ASSIGNOR TO THE CONSOLIDATED FASTENER COMPANY, OF PORTLAND, MAINE.

LACING-STUD FASTENER.

SPECIFICATION forming part of Letters Patent No. 519,847, dated May 15, 1894.

Application filed September 9, 1893. Serial No. 485,182. (No model.)

*To all whom it may concern:*

Be it known that I, PIERRE ALBERT RAYMOND, a citizen of the Republic of France, residing at Grenoble, Isère, France, have invented an Improvement in Lacing-Stud Fasteners, of which the following is a full specification.

My invention relates to the class of lacing stud fasteners used with gloves and other articles in which an ordinary lacing is used in connection with studs or hooks attached to the edges of the glove or other article, to engage the said lacing, and consists of special features in the construction of the stud, hereinafter described in detail.

Referring to the accompanying drawings Figure 1 is a sectional view of the parts of my lacing stud fastener before setting. Fig. 2 is a sectional view of my lacing stud fastener after it has been set on the material of the glove or other article. Fig. 3 is a sectional view of the parts of my lacing stud fastener as placed on the material and in the dies prior to setting. Fig. 4 is a perspective view of the lower die and anvils. Fig. 5 is a plan view of the head of my lacing stud fastener before use, and Fig. 6 is a plan view of the same after use. Fig. 7 is an elevation showing the appearance of my lacing stud fastener as applied to shoes.

Before setting, my lacing stud fastener consists of two parts, shown in Fig. 1, the head A, and the eyelet B. The head A is formed by the straight attaching eyelet or shank $a'$, and the cap $a$, whose outer edge is turned down and under the horizontal flanged head of the said attaching eyelet $a'$. The lower end of the shank $a'$ may be open or closed. The eyelet B is formed in one piece, of the shape shown in the drawings, having the flat flange $b$, and the shank $b'$, which is flared at its upper end so as to be upset by anvil plate $f f'$. In Fig. 2, which shows my lacing stud fastener attached to the material, it will be seen that the eyelet B is firmly clinched to the material; the lower end of the attaching eyelet $a'$ is upset in the eyelet B, being expanded or compressed within said eyelet B, and consequently adhering strongly thereto and resisting any attempt to push it through or pull it out of said eyelet B; the upper end of the eyelet $a'$ forms a neck or shank and holds the head of my lacing stud fastener at any desired distance above the material. All of these results are accomplished in one operation of setting, by means of the dies shown in Figs. 3 and 4, for which I propose to make application for Letters Patent of the United States.

The machine is provided with the movable plunger C carrying on its lower end the die $c$, being simply flat on its lower side. The device lettered D in the drawings, which rests in the machine directly beneath the plunger consists of a solid lower die $d$, having in its upper side a concavity $e$, in which the head of my lacing stud fastener is placed, the shank or eyelet $a'$ projecting upward; and resting on top of the die $d$, and covering the concavity $e$ is the gage and split anvil plate $f f'$. One half $f$ of this gage and anvil plate is firmly riveted to the die $d$, while the other half $f'$ is pivoted thereto and capable of being swung around in a horizontal plane in order to insert or remove a stud head A. The plate $f f'$ not only acts as an anvil plate, but also as a gage to determine the height of the head of the stud above the material as will be hereinafter fully explained. The movable half $f'$ of the gage and anvil plate is pressed firmly against the other half by a spring, and the two pieces are perforated at the union to allow the shank $a'$ to project through, while they closely embrace it. The device D thus embodies two anvils and acts as a holder of the rivet, both to adjust it in its correct position, and to hold it in place while the act of setting takes place.

In setting my lacing stud fastener a head A is placed in the lower die, the shank $a'$ projecting up through the split gage and anvil plate $f f'$, as shown in the drawings. The eyelet B is then placed loosely in the material on which the lacing stud fastener is to be set, and pushed over the end of the upwardly projecting shank $a'$, the flared end of its shank $b'$ resting on the split gage and anvil plate $f f'$. The upper die is then pressed down upon the end of the shank $a'$ and the eyelet B. The split gage and anvil plate $f f'$ clinches the eyelet B firmly to the material, while at the same time the end of the shank $a'$ is upset by the die $c$ spreading as hereinbefore stated, within the eyelet B. The manner in which the shank is grasped by the split anvil plate prevents the upper part from being upset or thickened, and confines the upsetting to the end or that portion between the lines $x$ $x$ and $y$ $y$—the upper part remaining straight and of the same diameter as before. The pressure is continued until the eyelet B and the material are pressed down firmly on the split gage and anvil plate $f f'$. It will be seen that the split plate $f f'$ interposed between the material and the head serves not only as an anvil to clinch the eyelet B but also acts as a gage and prevents the head from being set down close to the material. It is evident that the distance between the head and the material, i. e., the length of the neck should vary according to the size of the studs, and the lace employed, and this is very easily accomplished in my device by varying the thickness of the interposed gage plate. It will be observed that the above described operations are simultaneously performed by one pressure of the dies, and for this reason the end of the shank is compressed tightly within the eyelet B.

I do not in this application make any claim for the setting mechanism shown and described as the same will be made the subject of another application.

In Fig. 7 my lacing stud fastener is shown as applied to shoes, and it is evident that in this case much more distance is required between the head and the material than is the case when used with gloves, where it is necessary to have the head lie down as flat as possible on the kid or other material.

Ordinary lacing stud heads present a very bad appearance after being used a short time owing to the fact that the japan or other finish wears off, leaving the raw metal exposed. In my lacing stud fastener I avoid this difficulty as shown in Figs. 5 and 6 by decorating the cap with a slightly raised or embossed design before finishing it. Besides improving the appearance of the stud at first the effect rather improves with use, the raised parts becoming worn while protecting the lower parts, and thus presenting the appearance of a bright design on a dark ground.

I claim—

A lacing stud fastener A, having the cap $a$ and the straight rivet $a'$ in combination with the eyelet B having the flange $b$, and the flared shank $b'$, the said rivet $a'$ being upset between the walls of the eyelet B, all formed and arranged as and for the purposes substantially as described.

In witness whereof I have hereunto set my hand.

PIERRE ALBERT RAYMOND.

Witnesses:
ED. FISCHER,
A. DECHANY.